United States Patent [19]

Gaussoin et al.

[11] 3,869,617
[45] Mar. 4, 1975

[54] SPRAY SUPPRESSING DEVICE FOR A HIGHWAY VEHICLE

[75] Inventors: Julius Gaussoin, Vancouver, Wash.; Robert B. Nottingham, Lake Oswego; Robert E. Reichard, Gresham, both of Oreg.

[73] Assignee: Silver Eagle Manufacturing Co., Inc., Portland, Oreg.

[22] Filed: Sept. 4, 1973

[21] Appl. No.: 394,147

[52] U.S. Cl............................ 290/1 S, 280/154.5 R
[51] Int. Cl............................................ B02d 35/00
[58] Field of Search................ 280/154.5 R; 296/1 S

[56] References Cited
UNITED STATES PATENTS
3,091,478  5/1963  Ambli .......................... 280/154.5 R
3,737,176  6/1973  Cobb........................... 280/154.5 R
3,743,343  7/1973  Grote................................. 296/1 S

*Primary Examiner*—Robert R. Song
*Attorney, Agent, or Firm*—Klarquist, Sparkman, Campbell, Leigh, Hall & Whinston

[57] ABSTRACT

Air is directed inwardly by one or more deflectors past the periphery of a rear wheel of a vehicle to direct water thrown by the wheel away from the outer side of the vehicle. The deflectors may each include a trapezoidal flexible sheet mounted on rod arms of a mounting frame having overload spring portions, and curved rod sewed to the mounting frame holds the inner edge of the sheet in the form of a trough.

9 Claims, 6 Drawing Figures

PATENTED MAR 4 1975

SPRAY SUPPRESSING DEVICE FOR A HIGHWAY VEHICLE

DESCRIPTION

This invention relates to a spray suppressing device for a highway vehicle, and has for an object thereof the provision of a new and improved spray suppression device.

Another object of the invention is to provide a spray suppressing device adapted to create air flow over a tire of a vehicle inwardly from the outer side of the tire to reduce flow of water toward outwardly beyond the outer side of the vehicle.

A further object of the invention is to provide a spray suppressing device including a deflector deflecting air inwardly from the outer side of a vehicle tire across the peripheral portion of the tire to deflect water thrown by the tire away from the outer side of the vehicle.

Another object of the invention is to provide a spray suppressing device including a scoop-like deflector deflecting air inwardly past the periphery of a tire of a vehicle from the area adjacent the outer side of the tire.

Another object of the invention is to provide a spray suppressing device including a deflector having a mounting frame adapted to be secured to a vehicle frame and support a scoop-like sheet either in a position in the front or the rear of tires of the vehicle.

Figure 2:
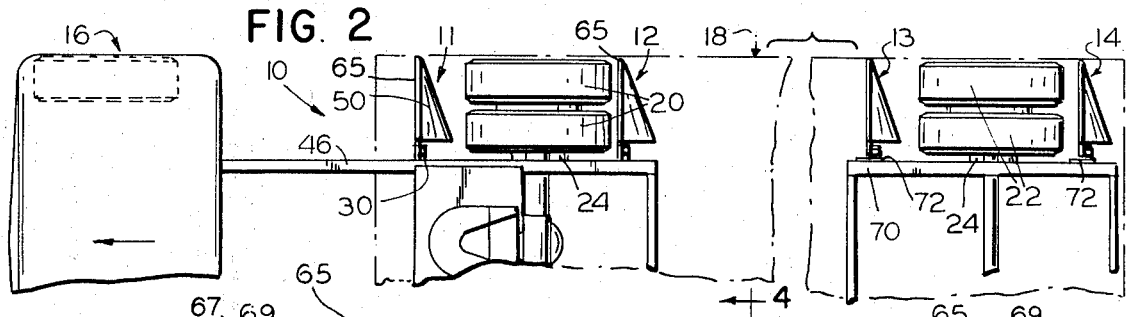
FIG. 2 is a fragmentary, horizontal sectional view taken along line 2—2 of FIG. 1.
Figure 3:
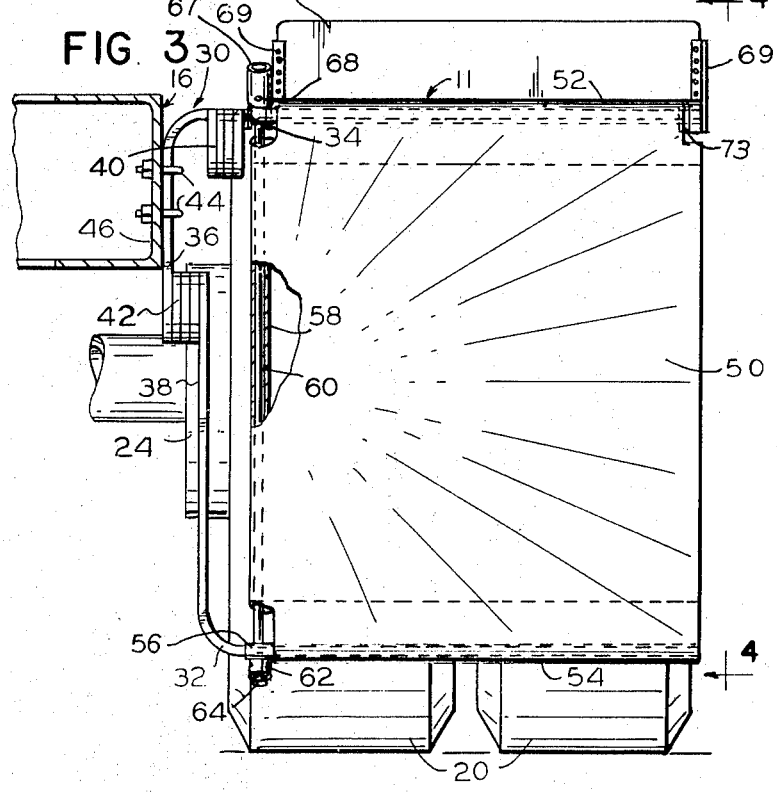
FIG. 3 is an enlarged, fragmentary, vertical, sectional view taken along line 3—3 of FIG. 1.
Figure 4:
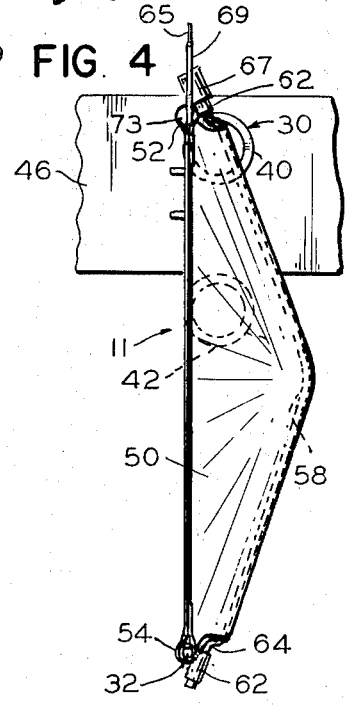
FIG. 4 is an enlarged, fragmentary vertical sectional view taken along line 4—4 of FIG. 3.

Referring now in detail to the drawings, there is shown therein a truck 10 having spray suppression devices or deflectors 11, 12, 13 and 14 forming specific embodiments of the invention. The truck shown includes a tractor 16 and a semi-trailer 18. There are a pair of each of the devices 11 to 14. That is, one device 11 for the front of the lefthand tired wheels 20 of the tractor 16, and an allochiral spray suppressing device (not shown) for the front of the righthand tired wheels of the tractor, a pair of allochiral devices 12 for the rear of the lefthand and righthand pairs of wheels 20, and allochiral pairs of the devices 13 and 14 for lefthand and righthand tired wheels 22 of the trailer 18. The deflectors, as best shown in FIGS. 2 and 3 extend to the side edges of the trailer body and increase the velocity of air encountered and divert it at higher velocity to the zone next to the inner sides of the wheeled tires. This in effect, creates an increased velocity stream of air past such inner sides, to create a low static pressure at such places to cause air and water around the peripheries of the tires to flow inwardly into that increased velocity stream of air. This prevents outward escape of water thrown off the tires, so that there is much less spray of water at the sides of the truck.

The above described air stream at the inner sides of wheels 24 serves the additional important function of cooling the wheel brakes, this being in contrast to shielding for the wheels and tires, which would isolate and cause brake heating.

The deflectors 11 to 14 are substantially identical, and only the deflector 11 is described in detail. The deflector 11 includes a square rod metal frame 30 of generally C-shape, with a lower horizontal arm 32, an upper horizontal arm 34, and two vertical portions 36 and 38. The arm 34 and the portion 38 are joined to the portion 36 by stiff, overload release, coil spring portions 40 and 42. The frame is of one piece construction and the coil spring is formed from the material itself. For truck tractors, the coil spring portion 40 is provided to allow the upper arm to deflect if inadvertently it is jammed against another structure. The coil spring portion 42 allows the lower arm to deflect forwardly or rearwardly in case it is brought into engagement with an outside object. The deflector frame is anchored by U-bolts 44 to the longitudinal member 46 of the truck tractor chassis.

The deflector portion proper of the deflector 11 is in the form of a flexible fabric sheet 50 which is in trapezoidal shape, although that is not apparent from FIG. 3. The sheet has portions 52 and 54 sewn into its upper and lower edges to receive the upper and lower metal tubes 56 which slide onto the arms 32 and 34 of the frame 30. The sheet has a similar sleeve portion 58, through which a bowed rod 60 passes, which causes the inner portion of the fabric sheet to billow while the outer edges of the sheet are relatively straight to form a shallow trough portion. The tubes 56 are slid onto the arms 32 and 34 and secured thereon by set screws 61 and carry tubular sockets 62 welded thereto and receiving offset end portions 64 of the rod 60.

Figure 5:
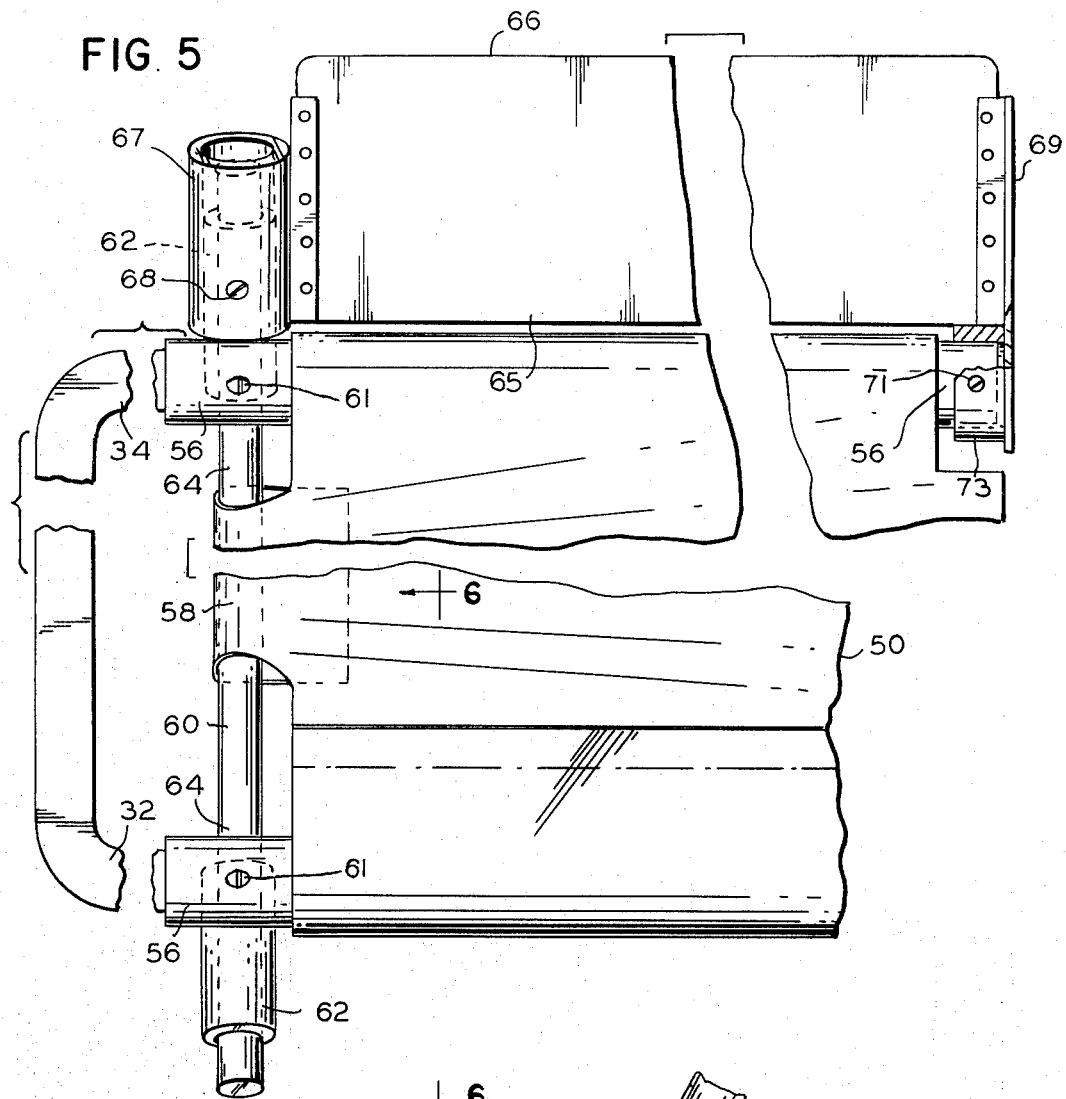
FIG. 5 is an enlarged, fragmentary view taken along line 3—3 of FIG. 1.
Figure 6:
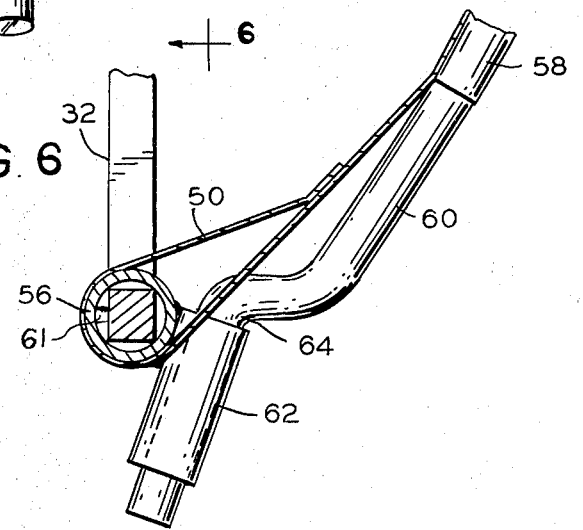
FIG. 6 is an enlarged, fragmentary, vertical sectional view taken along line 6—6 of FIG. 5.

To minimize flow of air over the tops of the tired wheels longitudinally of the truck tractor and trailer, each of the devices 11 and 12 (FIG. 5) has a filler strip or deflector 65 having a flexible, slightly stretchable, squeegee-like upper portion 66 wipingly engaging the bottom of the floor of the trailer. Each strip 65 is secured at one end thereof to a sleeve 67 rigidly fixed to the upper socket 62 by a set screw 68. The other end of each strip is secured to a plate 69 secured to the tube 56 by a set screw 71 in a socket portion 73 rigid with the plate 69.

Figure 1:
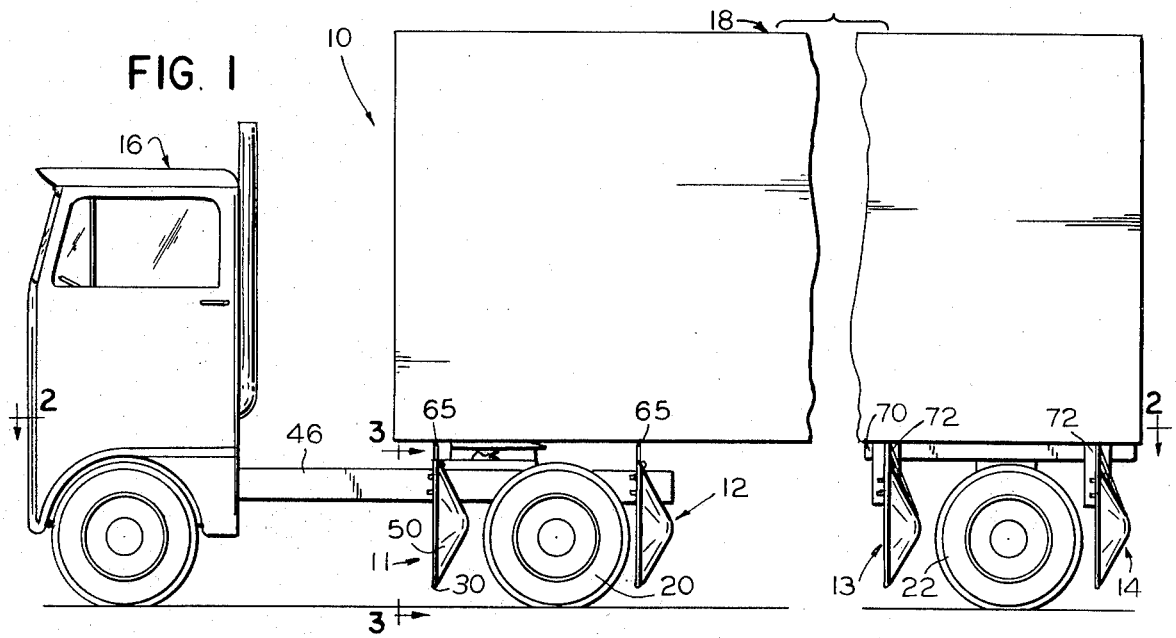
FIG. 1 is a fragmentary, side elevation view of a truck having spray suppressing devices forming specific embodiments of the invention.

The pairs of deflectors 13 and 14 (FIGS. 1 and 2) are like the pairs of deflectors 11 and 12 except that, being carried by longitudinal members 70 of the trailer chassis, are mounted by U-bolts on base plates 72 which are bolted or otherwise secured to the members 70, and do not include the strips 65. The base plates mount the deflectors 13 and 14 in positions engaging the bottom of the floor of the trailer body.

As best shown in FIG. 3, the deflectors cover substantially the entire areas below the floor of the trailer except for the extreme lower portions of these areas which are necessary for ground clearance. Each deflector deflects the air into a somewhat sheet-like, high velocity stream passing along the inner side of the pair of tired wheels 20 with the funnel effect making the heaviest flow just above the axle. The streams from the front deflectors 11 and 13 cause the air and water to flow inwardly over the entire peripheral portions of the tires to these streams, except for the bottom portions of the tires engaging the ground, and the effect of the rear deflectors 12 and 14 cause increased flow of air and water inwardly past the rear peripheral portions of the tires and brakes. The effect of the deflectors is to make the areas along the sides of the vehicle substantially spray free.

What is claimed is:

1. In a spray suppressing device for a highway vehicle having a tired wheel comprising air flow directing means mounted on the vehicle in a position adapted to flow air inwardly from the zone outside the wheel past the exposed peripheral portions of the tired wheel to prevent water thrown by the wheel from travelling outwardly relative to the vehicle, the flow directing means including a sheet-like deflector positioned in front of the tired wheel and extending rearwardly and inwardly relative to the vehicle for directing air inwardly relative to the vehicle and converging the flow of air therepast.

2. The spray suppressing device of claim 1 wherein the converged flow of air is just above the axle of the vehicle.

3. The spray suppressing device of claim 1 wherein the converged flow of air is directed to brakes positioned at the inner side of the tired wheel.

4. In a spray suppressing device:

mounting means adapted to be secured to the chassis of a vehicle, frame means, a flexible sheet having opposite edge portions secured to the frame means, and connector means connecting the frame means to the mounting means, the frame means holding the sheet in a scoop-like form in a position extending rearwardly and inwardly relative to the vehicle to deflect air inwardly relative to the vehicle.

5. The spray suppressing device of claim 4 wherein the connector means comprises overload release means.

6. The spray suppressing device of claim 5 wherein the overload release means comprises torsion spring means.

7. In a spray suppressing device for a highway vehicle having a tired wheel comprising air flow directing means mounted on the vehicle in a position adapted to flow air inwardly from the zone outside the wheel past the exposed peripheral portions of the tired wheel to prevent water thrown by the wheel from travelling outwardly relative to the vehicle, the flow directing means including a sheet-like deflector positioned adjacent the tired wheel and extending rearwardly and inwardly relative to the vehicle for directing air inwardly relative to the vehicle, and overload release means mounting the deflector means on the vehicle and including a stiff torsion spring.

8. In a spray suppressing device for a highway vehicle having a tired wheel comprising air flow directing means mounted on the vehicle in a position adapted to flow air inwardly from the zone outside the wheel past the exposed peripheral portions of the tired wheel to prevent water thrown by the wheel from travelling outwardly relative to the vehicle, the flow directing means including a sheet-like deflector positioned in front of the tired wheel and extending rearwardly and inwardly relative to the vehicle for directing air inwardly relative to the vehicle, and an upper wiper strip adapted to contact a floor of a trailer.

9. In a spray suppressing device for a highway vehicle having a tired wheel a deflector of scoop-like form, and means mounting the deflector on the vehicle in a position in front of tired wheel of the vehicle and extending rearwardly and inwardly relative to the vehicle so as to converge air and flow the air inwardly from the zone outside the wheel and along the inner side of the wheel.

* * * * *